United States Patent
Striebel et al.

(10) Patent No.: US 7,198,253 B2
(45) Date of Patent: Apr. 3, 2007

(54) WIRE ROPE CONNECTORS AND TENSIONERS FOR DECK RAILING SYSTEMS

(75) Inventors: Roman F. Striebel, Duxbury, MA (US); Patrick A. Striebel, Pembroke, MA (US)

(73) Assignee: Suncor Stainless, Inc., Plymouth, MA (US)

( * ) Notice: Subject to any disclaimer, the term of this patent is extended or adjusted under 35 U.S.C. 154(b) by 29 days.

(21) Appl. No.: 10/802,445

(22) Filed: Mar. 17, 2004

(65) Prior Publication Data

US 2005/0207838 A1  Sep. 22, 2005

(51) Int. Cl.
*B21F 9/00* (2006.01)
*B66F 3/00* (2006.01)
*B25B 25/00* (2006.01)

(52) U.S. Cl. .................. 254/231; 254/232; 403/275
(58) Field of Classification Search ............. 254/231, 254/232, 233, 234; 114/107; 74/89; 403/369, 403/68
See application file for complete search history.

(56) References Cited

U.S. PATENT DOCUMENTS

| | | | | |
|---|---|---|---|---|
| 2,463,144 A | * | 3/1949 | Buchanan | 439/805 |
| 3,278,210 A | * | 10/1966 | Sanders | 403/46 |
| 3,652,049 A | * | 3/1972 | McCown | 248/310 |
| 3,895,879 A | * | 7/1975 | Burtelson | 403/369 |
| 3,960,359 A | * | 6/1976 | Svahn et al. | 254/231 |
| 4,066,368 A | * | 1/1978 | Mastalski et al. | 403/211 |
| 4,627,762 A | | 12/1986 | Scotti | 403/369 |
| 4,671,695 A | | 6/1987 | Scotti | 403/213 |
| 2003/0010966 A1 | * | 1/2003 | Sjostedt | 254/231 |
| 2003/0178611 A1 | * | 9/2003 | Anderson | 254/231 |

* cited by examiner

*Primary Examiner*—Kathy Matecki
*Assistant Examiner*—Evan Langdon
(74) *Attorney, Agent, or Firm*—Jacob N. Erlich; Burns & Levinson, LLP (57) ABSTRACT

Wire attachment and/or tensioning assemblies are described. The ends of wires may be fitted with mateable collar and wedge components to allow the wire to be securely attached to a supporting structure such as, for example, the surface of a railing post. The wire attachment assembly may be rotatably attached to a tensioning device that enables wire tension adjustments without rotating the wire itself, thereby avoiding the need to adjust the opposing end of the wire.

18 Claims, 6 Drawing Sheets

WIRE ROPE CONNECTORS AND TENSIONERS FOR DECK RAILING SYSTEMS

FIELD OF THE INVENTION

The present invention relates to railing systems, and more particularly to easily configurable fixtures for attaching and/or tensioning cabling, rope or wire rope to surfaces such as those of railing corner posts.

BACKGROUND OF THE INVENTION

Traditional deck railings consist primarily of vertical balusters of wood or PVC in a variety of shapes, either set into specially shaped top and bottom rails, or attached to standard pieces of lumber. Most of the rail components are pressure-treated to resist rot and mildew but have to be cleaned, painted and/or sealed on a regular, often yearly basis, depending on the climate. Additionally, attaching such wooden balusters can be labor intensive and requires care while working with wood, due to the naturally occurring deformations and tendency to split.

Some railing developers have endeavored to form railings employing horizontal wires or wire rope, spaced equally according to building regulations. Although most of the wire rope contemplated or used is stainless, the end fittings employed in such systems are either not stainless, and therefore corrode faster, or are stainless but require swaging by machine or manually with special hand swaging devices. In most cases, such end fittings are not reusable, and often must be discarded if not installed correctly, resulting typically in a significant waste of wire rope as well. In other systems, wire rope ends are formed into a loop and crimped, which is very unsightly. In yet other systems, several types of fittings are required for installation and tensioning the installed wire rope sections.

A further significant disadvantage of existing railing systems is that average homeowners and even semi-skilled construction workers find installations to be difficult or impossible. The knowledge required to correctly swage for sufficient breaking strength, and to choose the correct fittings and wire rope is usually possessed only by specialty industrial or marine (i.e., sailing, rigging) companies, which greatly limits their use in standard residential installations. Furthermore, such specialized know-how makes stainless systems too expensive to be considered for standard houses, and impossible to mass market.

Other existing systems have even more pronounced limitations that become evident when railings are to be installed on stairs leading from or to a deck. There are too many variables to make such systems easy to install; in every existing application different fittings have to be chosen, or standard ones modified, to allow them to be used. Presently, the scope of installations on stairs requires considerable knowledge, far beyond that of the average homeowner or general contractor.

There is a well-established general trend and desire for homes and commercial structures to be largely maintenance free, which can be seen from the introduction of decking material made from recycled plastic, and the use of PVC posts and other more easily manipulated building materials.

Accordingly, an objective of the present invention is to introduce maintenance-free deck railings that can be successfully installed with simple tools by either unskilled construction workers, or by very moderately skilled homeowners.

SUMMARY OF THE INVENTION

The objects set forth above as well as further and other objects and advantages of the present invention are achieved by the embodiments of the invention described hereinbelow.

In one aspect, the present invention provides an assembly for easily attaching a wire to a rigid body, such as a free-standing bolt or a fixed surface of existing or new standard corner or end posts. As used herein, the term "wire" refers to unsheathed or sheathed wire or wire rope, of which 7×7, 1×19, and 7×19 are common constructions. The rigid body may be composed of any solid material (e.g., wood, plastic or metal.) The wire attachment assembly includes a collar component having a center aperture dimensioned to receive the wire, a threaded portion, and a tapered internal recess, a cylindrical member having a threaded end engaging the threaded portion of the collar, and a tapered wedge disposed between the collar and cylindrical member. The tapered wedge also has a center aperture dimensioned to receive the wire, but also has a groove extending along the length of the wedge such that when the cylindrical member and collar are screwed together, the tapered internal recess of the collar component compresses or crimps the tapered wedge tightly around the wire. The internal surface of the wedge may additionally have rough features to further secure the wire within the wedge.

The collar component and cylindrical member preferably have shoulder portions (i.e., flats or hexes) allowing gripping and turning with a tool. The cylindrical member may optionally have a center recess that can receive an end portion of the wire passing through the collar and wedge. The entire assembly is preferably comprised of a hard material such as solid plastic or metal.

In another aspect, the present invention provides a wire attachment and tensioning device, including a rigid body having a threaded end, any means for attaching the wire to the rigid body, and a rotatable tensioning assembly attached to a support surface. The rotatable tensioning assembly has a threaded end that engages the threaded end of the rigid body, so that rotating the tensioning assembly adjusts the distance of the wire attaching means from the support surface, thereby tightening or tensioning the wire.

In another aspect, the present invention provides a railing system that employs such wire attachment and/or wire tensioning means. In such a railing system, a wire of predetermined dimensions is fixed to a post, or a tensioning device affixed to the post, by means of a wire attachment assembly (e.g., a single gripping wedge inside a frustoconical collar.) The wire may pass through intermediate posts of the railing system that have channels or bore holes to receive the wire, until the wire reaches an opposing corner post, where it attaches to another tensioning device that is in turn attached to a corner post.

Since each tensioning device includes a rotatable component, tensioning of the wire can be achieved at either or both mounting posts without either twisting the wire or untensioning the opposing tensioning device. This is preferably accomplished by gripping a feature such as a flat or hex on the wire attachment assembly with a wrench to hold the wire steady, and inserting a tool such as, for example, a screw driver, into the hole near the fixed end and turning till the desired tension is achieved.

In a preferred embodiment, the tensioning device can be adjusted from 0 to 45 degrees from a position normal to the mounting post by means of a suitable recess in a plate used to affix the tensioner to the post. By appropriately orientating the plate and recess, one can achieve this angular attachment in any direction desired. Thus, the same type of tensioning device may be employed to attach wire on a staircase to railing posts at different elevations, and to be used for left hand or right hand corners.

The following additional advantages of the present invention will become apparent when reading the descriptions and drawings:

multiple lengths of wire can be positioned at any vertical interval desired or prescribed by building codes, by securing the attachment assembly and/or tensioning device at proper positions on the post;

multiple tensioning devices will be have an aesthetically pleasing uniform distance from the surface(s) to which they are attached;

wire is easily attached to the tensioning device with simple tools;

the tensioning device is universally adaptable to any railing geometry and/or varying elevations, greatly simplifying installations and inventory required, as only three different types components are necessary regardless of the type of decking or stairway—the tensioning device, a suitably sized wire rope and suitable fasteners;

the tensioning device is maintenance free, if made from preferred stainless steel or other corrosion resistant material, yet can be re-tensioned at a later stage should wire ropes become slack through use or significant temperature changes;

there is no need to fit any wire rope terminal to intermediate posts, and since only the wire rope itself is fed through those posts, the holes can be of similar size to such wire rope, thus locating said wire rope precisely though the posts without any possible movement;

the fasteners used to affix the tensioning device to the surface can be sized to terminate within the surface, allowing the wire ropes to be attached at adjoining right angles and at precisely the same height, which is impossible for most existing fittings, as conventional systems typically require bolting through the posts;

the individual wire ropes do not need to be pre-cut, as the end of each can be fed through all intermediate posts before being attached to the first tensioning device, after which the wire ropes can be pulled straight, and eventually cut to the exact length required just before attaching them to the opposite tensioning device; this greatly simplifies installation, and eliminates waste as it makes pre-cut or pre-swaged lengths obsolete;

waste of wire is minimized as the wire needs to be cut only after it has been unfurled from a reel or spool.

The tensioning device may include a feature such as, for example, a trans-axial hole through the assembly or a shoulder (i.e., flat or hex), to facilitate turning the device with a simple tool to effect the tension on the wire. Various embodiments of the tensioning device described below employ different configurations for rotatably attaching the device to a surface. In one embodiment, the attachment is achieved by a threaded connection to a threaded bolt protruding from the surface. In another embodiment, the attachment is made to a threaded swivel rotatably secured to the surface by a recessed plate and plate fasteners. Other attachment configurations are possible and are deemed to be with the scope of the present invention.

BRIEF DESCRIPTION OF THE FIGURES

For a better understanding of the present invention, together with other and further objects thereof, reference is made to the accompanying drawing and detailed description, wherein.

DETAILED DESCRIPTION OF THE PREFERRED EMBODIMENTS

The present invention provides a wire rope attachment means, tensioning means, and railing systems incorporating such means.

Figure 1:
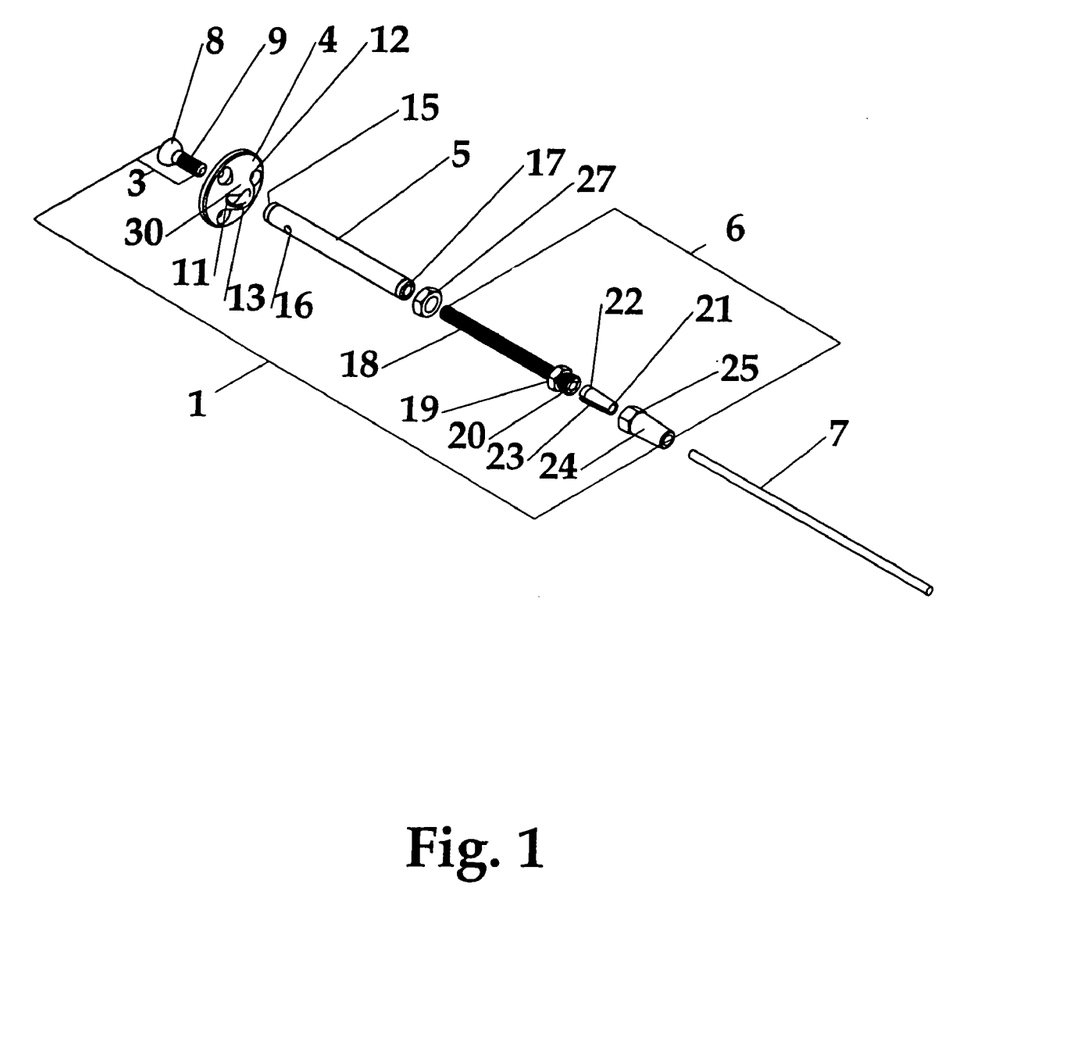
FIG. 1 is a exploded schematic view of a wire attachment and tensioning assembly in accordance with the present invention.

In a preferred embodiment, shown in FIG. 1 in an exploded perspective view, the present invention provides wire attachment assembly 6 that can be combined with a tensioning assembly to form a wire attachment and tensioning device 1. Each sub-assembly is preferably made entirely from stainless steel, or other corrosion resistant materials. In a preferred embodiment, the device is comprised of a threaded swivel 3, a mounting plate 4 having a center aperture 13, a tubular body 5 and the threaded wire rope attachment assembly 6 including a gripping wedge 22, collar 24 and rigid threaded stud 18.

The tensioning assembly is rotatably attachable to (or through) a support surface such as a railing post or a wall and includes a threaded end 17 to engage a threaded end of the stud 18 such that rotating the tensioning assembly adjusts the distance between wire 7 and the support surface. The threaded swivel 3 preferably includes a substantially hemispherical portion 8 and a threaded stud 9 that engages a threaded end 15 of tubular body 5 through the center aperture 13 of plate 4. The plate 4 has an internal recess 10 dimensioned to rotatably receive the hemispherical portion 8 such that the threaded swivel 3 will turn when the plate 4 is mounted to a support surface. The center aperture 13 may also be formed to follow the contours of the hemispherical portion 8, thus allowing easy rotation of the threaded swivel 3 even when under tension. About the perimeter of center aperture 13 is disposed a cylindrical flange 30 having a groove 11 that is of a size permitting the threaded swivel to be positioned at an angle of up to 45 degrees with respect to an imaginary center axis of the center aperture 13.

Figure 2:
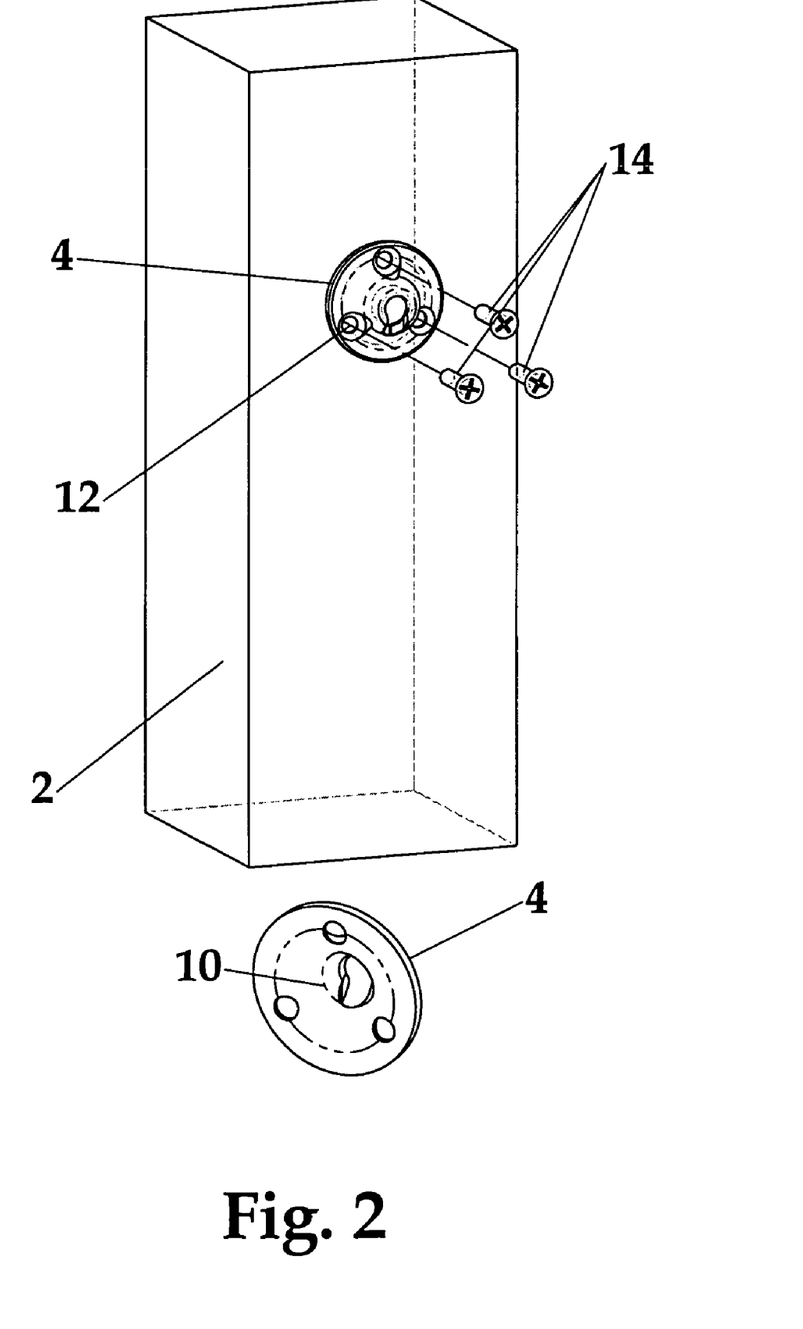
FIG. 2 is a schematic illustrating the fastening of a mounting plate to a surface of a railing post.

With respect to FIG. 2, the internal recess 10 of the plate 4 is dimensioned so as to completely contain the hemispherical portion 8, even when the swivel 3 is oriented in an off-axis position. The plate 4 may be attached to the support surface by any conventional means, including through the use of fasteners or adhesives. In the preferred embodiment illustrated, a plurality of recessed holes 12 of a suitable size and shape are symmetrically spaced about the face of the plate 4. Fasteners such as stainless standard wood decking screws 14 are used that have a thickness and length sufficient to securely affix the plate to an end or corner post 2 and to transfer the desired tension to the wire attachment and tensioning device.

With reference again to FIG. 1, the tubular body 5 is a substantially cylindrical shaped tube, hollow on the inside and preferably smooth on the outside. Threaded end 15 is preferably internally threaded in a way to accept the threaded stud 9 of the swivel 3. Alternatively, the threaded end 15 could be externally threaded while swivel 3 has an internal thread. After engaging threaded stud 9 with threaded end 15, the thread positions can be locked mechanically or with a suitable liquid thread locking compound, so as to firmly bond the swivel 3 to the tubular body 5. In yet another embodiment, the swivel 3 and tubular body 5 could comprise one single part. Once the plate 4 has been attached to a post 2, the tubular body 5 and the swivel 3 will always rotate together without changing their combine total length. The rotation of the combined swivel 3 and body 5, which will be referred to hereinafter as the tensioner or tensioning subassembly when engaged with threaded stud 18 is what provides the ability to tension an attached wire.

Figure 3:
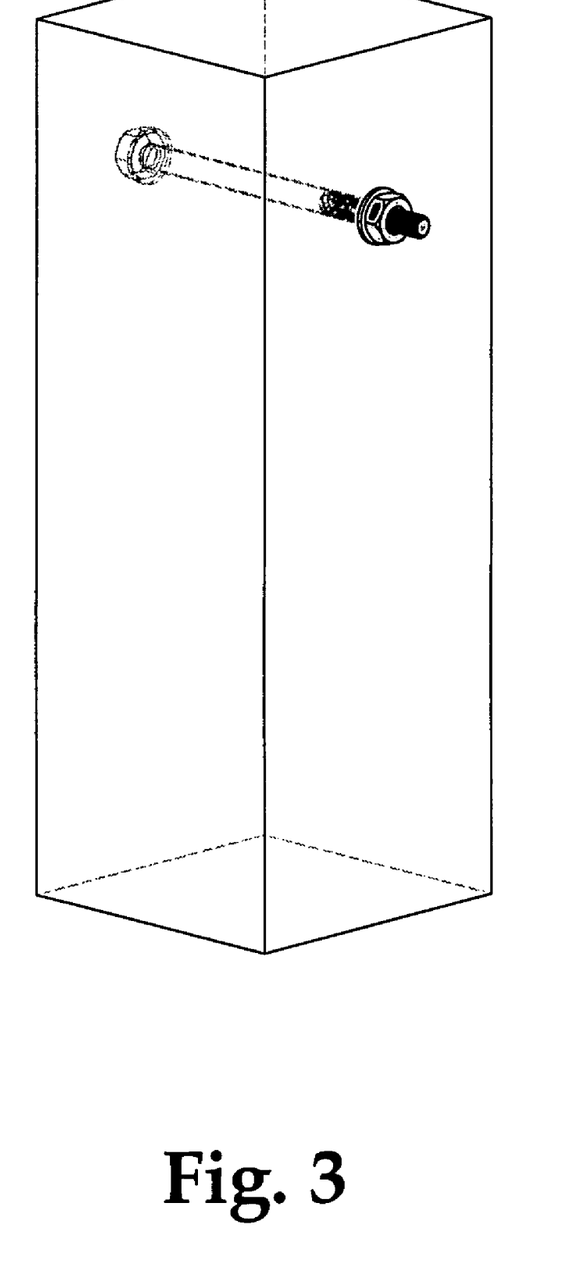
FIG. 3 is a schematic illustrating a lag bolt rotatably mounted through a railing post.

In an alternative configuration, the threaded tubular body 5 may consist of a lag bolt, with or without a washer, that is rotatably mounted through a post (such as shown in FIG. 3), thereby eliminating the need for a mounting plate.

Referring once again to FIG. 1, the tensioning subassembly preferably includes one or more features that allow gripping and turning with a tool. For example, hole 16 is disposed trans-axially through the tensioning subassembly to allow insertion of any suitably sized awl, screwdriver or similar tool for turning the subassembly. Other features, such as a circumferential shoulder (not shown) with flats or a hexed shape are equally useful for this purpose.

Stud 18 of the wire rope attachment assembly 6 has a threaded section (internal or external depending on the threaded end 17) long enough to engage completely threaded end 17 of the tubular body 5 and, optionally, to accommodate a lock nut 27. Lock nut 27 is used to secure the assembly after the desired tension has been achieved. At the opposite end of stud 18 is a shoulder 19 preferably in the shape of a hex, and a threaded portion 20 of a length and diameter suitable to accept an internal thread with collar 24. Collar 24 has a center aperture dimensioned to receive wire rope 7, a threaded portion for engaging stud 18, and a tapered internal recess.

In the preferred embodiment, a recess is located in the center of the threaded portion 20 of the stud 18 of a size suitable to accept the end of wire rope 7. Wire rope 7 is inserted first through the center aperture of collar 24, which preferably includes a hex-shaped shoulder 25 on the outer surface of the internally threaded end, thus allowing the collar to be engaged and tightened onto the threaded portion 20 of stud 18. After the wire rope is passed through the collar 24, it is inserted through a center aperture 21 of tapered gripping wedge 22, which is preferably made from aluminum, brass, copper or stainless, all sufficiently formable to allow compression onto the wire rope 7 during assembly and tightening. To ensure a tight fit and maximum fiction after assembly of the gripping wedge 22 on the wire rope 7, a groove or slot 23 of suitable width is provided over the full length of the gripping wedge 22 allowing the wedge to compress onto the wire rope when the stud 18 is screwed into the collar 24, forcing the wedge into the tapered internal recess of collar 24. To improve the friction generated by the compressed gripping wedge 22 on the wire rope 7, the inner surface of the tapered gripping wedge can optionally include features such as threads or serrations.

After the plate 4 has been firmly attached to a support surface and the wire rope 7 has been secured inside the wire rope attachment assembly (i.e., the collar-wedge-stud assembly,) the threaded stud 18 can be connected to the threaded end 17 of the tensioning subassembly. A grippable feature, such as hex portion 19, is held with a suitable tool, such as a wrench, to allow tightening of the wire without turning it or the wire attachment assembly. Only the tensioning subassembly (the tubular body 5 and swivel 3) rotates, preferably by means of a tool inserted through hole 16, and will do so freely within the plate 4. This enable tensioning at either opposing railing corner post without deforming the wire rope 7 or un-tensioning the opposing end.

With reference again to FIG. 4, the device 1 is shown attached to an end post 2 in a horizontal wire configuration. In such a configuration, the plate 4 should preferably be oriented in a way that the groove 11 is oriented downwards. This allows downward deflection of the wire to facilitate accessing to the holes 12 of the mounting plate 4 with an electric tool such as a drill to tighten the fasteners. The groove 11 has therefore the dual purpose of allowing the tensioning device to move up to about 45 degrees from the horizontal, and to permit the use of larger power tools instead of hand tools during attachment to any corner or end post.

Figure 4:
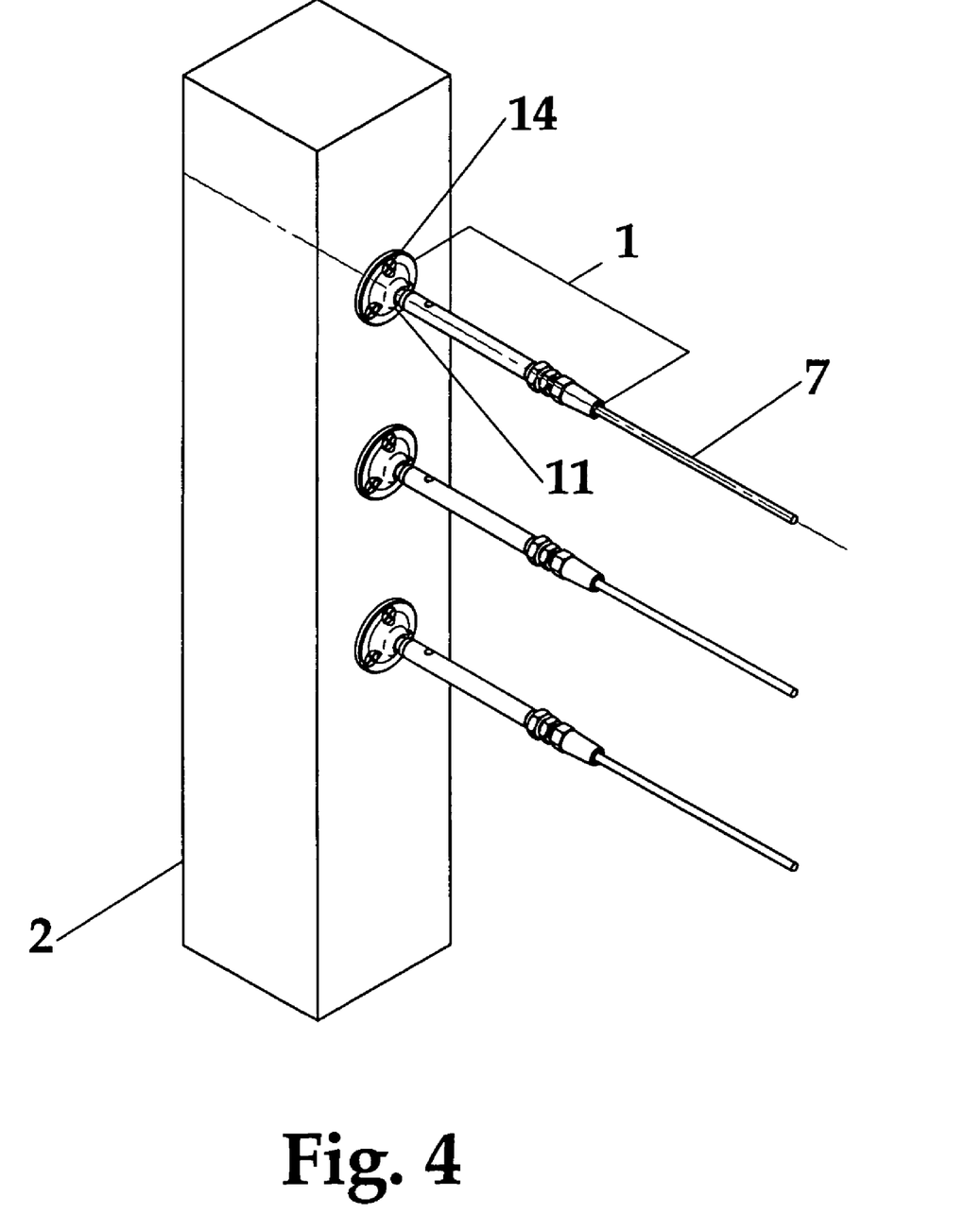
FIG. 4 is a schematic illustrating multiple wire attachment and tensioning devices mounted to one surface of a railing post.

In the railing system configuration depicted in FIG. 4, a plurality of tensioning devices are attached to the same support surface of a post, thus creating the desired or prescribed spacing between the individual strands of wire rope.

Figure 5:
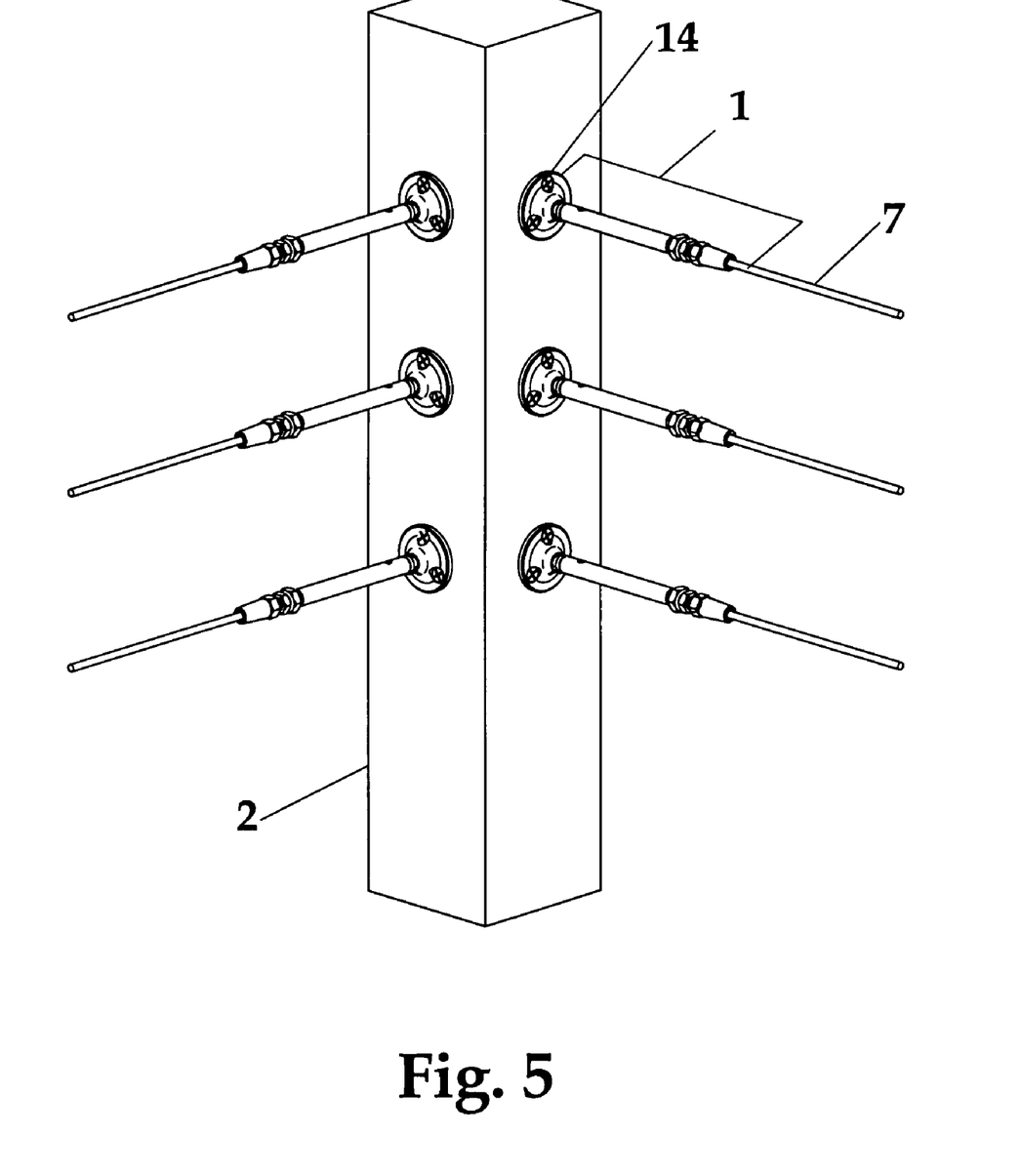
FIG. 5 is a schematic illustrating multiple wire attachment and tensioning devices mounted to two surfaces of a railing post.

FIG. 5 illustrates a configuration made possible by use of mounting plates 4, wherein several pairs of tensioning devices attach at 90 degrees to each other on a corner post, at various heights.

Figure 6:
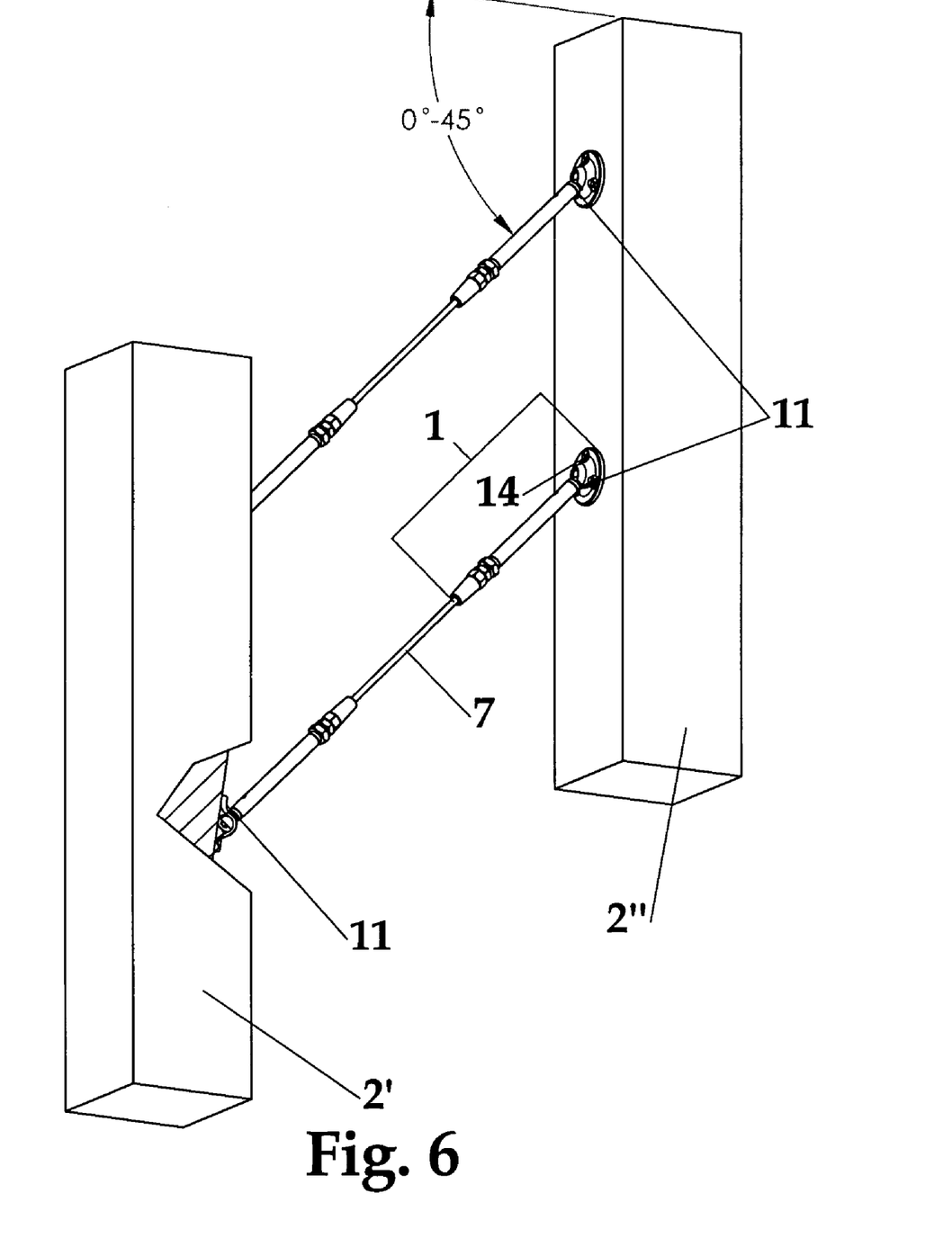
FIG. 6 is a schematic illustrating multiple wire attachment and tensioning devices mounted to two posts at different elevations.

FIG. 6 illustrates an application of the present invention in stairway railings, steps or handicap access ramps. This configuration differs from the standard horizontal installation in that the wire attachment and tensioning devices 1 on the lower post 2' are installed with each mounting plate groove 11 oriented upward and the devices 1 on the higher post 2" have mounting plate grooves oriented downward. This will allow each swivel 3 freedom to tilt within the mounting plate. In general, the orientation of the groove 11 determines the allowable deflection of the wire rope 7.

It will be readily appreciated by those skilled in the art that the wire rope attachment assembly by itself could be used without the rest of the tensioning components. This would be usefull in applications where tensioning is not required or desirable. In one such embodiment, the threaded stud 18 would be long enough to fit through the posts and be secured by a nut or other internally threaded device. Yet a further variation would be to replace the threaded stud 18 with a lag bolt or stud having a wood thread on its surface. This would permit the installation into any wood or PVC post using a suitably drilled hole. Although these variations of the device cannot be tensioned, they would offer a very short length of wire connection, which could be desirable or esthetically pleasing.

Although the invention has been described with respect to various embodiments, it should be realized this invention is also capable of a wide variety of further and other embodiments within the spirit of the invention.

We claim:

1. A wire attachment and tensioning device, comprising:
a rigid body having a threaded end;
means for attaching a portion of a wire to the rigid body in a fixed connection;
a tensioning assembly being an independent component from the attaching means and the rigid body, the tensioning assembly being fully rotatably attached to a support surface and the tensioning assembly including a threaded end to receive the threaded end of the rigid body such that rotating the tensioning assembly adjusts the distance of the portion of the wire attaching means from the support surface while maintaining the fixed connection between the rigid body and the wire unaffected by rotation of the tensioning assembly;
the tensioning assembly further comprising a cylindrical member including a first threaded end and a second threaded end, the first end being the threaded end receiving the threaded end of the rigid body; a threaded swivel engaging the cylindrical member;
a mounting plate including a center aperture through which the threaded swivel and cylindrical member are engaged, and an internal recess for rotatably receiving the threaded swivel to allow the cylindrical member and threaded swivel to freely rotate with respect to the mounting plate; and
means for fastening the plate to the support surface.

2. The device of claim 1, wherein the threaded swivel includes a substantially hemispherical surface for engaging the internal recess of the mounting plate.

3. The device of claim 1, wherein the mounting plate further includes a cylindrical flange about the center aperture having a groove dimensioned to allow wire attachment to the support surface at an angle of up to 45 degrees from the axis of the center aperture.

4. The device of claim 1, wherein
the mounting plate further includes a plurality of holes; and
the means for fastening the mounting plate to the support surface comprises a plurality of fasteners disposed through the holes of the mounting plate into the support surface.

5. The device of claim 1, wherein the tensioning assembly further comprises a feature allowing turning of the tensioning assembly with a tool.

6. The device of claim 5, wherein the feature comprises a hole disposed trans-axially through the tensioning assembly.

7. The device of claim 5, wherein the feature comprises a shoulder having a hexagonally shaped outer surface disposed circumferentially about a longitudinal axis of the tensioning assembly.

8. The device of claim 1, further comprising a means for locking the position of the tensioning assembly with respect to the wire attachment means.

9. The device of claim 1, wherein the tensioning assembly further comprises:
a feature allowing rotation of the cylindrical member with a tool; and
a rotatable threaded member protruding from the support surface engaging the second threaded end of the cylindrical member.

10. The device of claim 1, wherein the wire attaching means further comprises:
a collar including a center aperture dimensioned to receive the portion of the wire, a threaded portion, and a tapered internal recess; and
a tapered wedge-shaped unitary member disposed between the collar and the rigid body, and including a center aperture dimensioned to receive the portion of the wire and a groove or slot extending along the length of the wedge-shaped member;
wherein the rigid body further includes a second threaded end engaging the threaded portion of the collar such that when the rigid body and collar are screwed together the tapered internal recess of the collar compresses or crimps the tapered wedge-shaped member about the portion of the wire, to provide a tight fit between the wedge-shaped member and the wire, the tight fit remaining intact even upon loosening of the cylindrical member from the collar.

11. The device of claim 10, wherein the collar further comprises a shoulder allowing gripping with a tool.

12. The device of claim 10, wherein the rigid body further includes a shoulder allowing gripping with a tool.

13. The device of claim 10, wherein the rigid body further includes a center recess dimensioned to receive an end of the portion of the wire.

14. The device of claim 10, composed of at least one hard material selected from the group consisting of metals, plastics, and polymers.

15. The device of claim 10, wherein the inner surface of the wedge has features for increasing friction between the wedge and the wire.

16. A railing system including at least one wire attachment and tensioning device as per claim 1.

17. The railing system of claim 16, wherein the at least one wire attachment assembly is capable of connecting a wire to a surface at an angle.

18. The device of claim 1, wherein the cylindrical member of the tensioning assembly further comprises a feature allowing rotation of the cylindrical member with a tool.

* * * * *